United States Patent [19]

Augustitus et al.

[11] Patent Number: 5,088,764

[45] Date of Patent: Feb. 18, 1992

[54] AIR BAG MODULE CONSTRUCTION AND ASSEMBLY TECHNIQUE

[75] Inventors: James A. Augustitus, Utica; Mark T. Lecznar, Dearborn Heights; Pongdet Wipasuramonton, Rochester, all of Mich.

[73] Assignee: TRW Vehicle Safety Systems Inc., Washington, Mich.

[21] Appl. No.: 493,962

[22] Filed: Mar. 15, 1990

[51] Int. Cl.$^5$ .................... B60R 21/22; B60R 21/26
[52] U.S. Cl. .................................. 280/731; 280/736; 280/741
[58] Field of Search .............. 280/728, 730, 731, 736, 280/738, 740, 741; 29/235, 243.57, 281.5, 454, 469, 525.1; 72/267

[56] References Cited

U.S. PATENT DOCUMENTS

| | | | |
|---|---|---|---|
| 3,514,124 | 5/1970 | Richardson | 280/732 |
| 3,529,200 | 11/1970 | Chute | 280/731 |
| 3,624,810 | 11/1971 | Haas | 280/738 |
| 3,632,132 | 1/1972 | Richardson | 280/732 |
| 3,632,133 | 1/1972 | Haas | 280/738 |
| 3,632,135 | 1/1972 | Chute et al. | 280/731 |
| 3,640,546 | 2/1972 | Brawn | 280/732 |
| 3,692,495 | 9/1972 | Schneiter et al. | 422/166 |
| 3,715,131 | 2/1973 | Hurley et al. | 280/736 |
| 3,756,620 | 9/1973 | Radke | 280/743 |
| 3,768,824 | 10/1973 | Kloppe et al. | 280/731 |
| 3,787,074 | 1/1974 | Lewis et al. | 280/731 |
| 3,794,349 | 2/1974 | Fuller | 280/732 |
| 3,819,203 | 6/1974 | Radke et al. | 280/731 |
| 3,819,205 | 6/1974 | Dunford et al. | 280/731 |
| 3,836,169 | 9/1974 | Schiesterl | 280/731 |
| 3,837,669 | 9/1974 | Nagazumi et al. | 280/733 |
| 3,843,152 | 10/1974 | Nonaka | 280/731 |
| 3,880,447 | 4/1975 | Thorn et al. | 280/740 |
| 3,895,823 | 7/1975 | Stephenson | 280/731 |
| 3,901,530 | 8/1975 | Radke | 280/736 |
| 3,945,665 | 3/1976 | Tsutsumi et al. | 280/731 |
| 3,984,126 | 10/1976 | Gotz et al. | 280/740 |
| 4,013,305 | 3/1979 | Ichihara | 280/742 |
| 4,017,100 | 4/1977 | Gehrig et al. | 280/736 |
| 4,068,862 | 1/1978 | Ishi et al. | 280/740 |
| 4,148,503 | 4/1979 | Shiratori et al. | 280/731 |
| 4,153,273 | 5/1979 | Risko | 280/740 |
| 4,167,276 | 9/1979 | Bell et al. | 280/731 |
| 4,183,550 | 1/1980 | Sudou | 280/743 |
| 4,200,615 | 4/1980 | Hamilton et al. | 422/166 |
| 4,278,638 | 7/1981 | Nilsson et al. | 432/166 |
| 4,325,568 | 4/1982 | Clark et al. | 280/731 |
| 4,400,010 | 8/1983 | Stutz et al. | 280/732 |
| 4,414,902 | 11/1982 | Strasser et al. | 102/531 |
| 4,552,380 | 11/1985 | Stevens | 280/728 |
| 4,561,675 | 12/1985 | Adams et al. | 280/734 |
| 4,752,083 | 6/1988 | Honda | 280/731 |
| 4,810,005 | 3/1989 | Fohl | 280/732 |
| 4,830,401 | 5/1989 | Honda | 280/736 |
| 4,836,576 | 6/1989 | Werner et al. | 280/731 |
| 4,842,300 | 6/1989 | Ziomek et al. | 280/732 |

FOREIGN PATENT DOCUMENTS 2150743  4/1973  Fed. Rep. of Germany ...... 280/731

OTHER PUBLICATIONS

Boyer, H. and Gall, T., "Metals Handbook" Desk Edition, Cold Heading and Cold Extrusion, pp. 26-48 to 26-52, 1985.

*Primary Examiner*—Charles A. Marmor
*Assistant Examiner*—Tamara L. Finlay
*Attorney, Agent, or Firm*—Calfee, Halter & Griswold

[57] ABSTRACT

An air bag module structure comprises a pair of subassemblies which are coupled together to form the module. The subassemblies comprise an air/bag cover subassembly and an inflator/reaction device subassembly. The air bag cover has an air bag cavity, a folded air bag disposed within the cavity, and a rim surroudning an access opening that communicates with the access opening. The air bag has a gas inlet opening surrounded by a border portion of the air bag, which is adapted to be secured to the rim of the cover. The inflator/reaction device subassembly has an inflator housing with gas dispensing nozzles, a gas generating composition within the housing, and an integral reaction device extending outward of the inflator housing. The reaction device is secured to the rim of the cover, and couples the inflator/reaction device subassembly with the air bag/cover subassembly. When the subassemblies are coupled together, the gas dispensing nozzles are in fluid communication with the air bag gas inlet opening.

40 Claims, 11 Drawing Sheets

5,088,764

AIR BAG MODULE CONSTRUCTION AND ASSEMBLY TECHNIQUE

TECHNICAL FIELD

The present invention relates to an air bag module structure and to techniques for forming the air bag module structure. The air bag module comprises a pair of assemblies which are coupled together to form the module. One structure comprises a folded air bag/cover subassembly. The other structure comprises an inflator/reaction device subassembly. The subassemblies are separately formed, and then connected with each other to complete an air bag module.

BACKGROUND

A vehicle air bag module is a complete air bag unit which is assembled apart from the vehicle and then coupled as a unit with the vehicle. Typically, an air bag module includes (i) a reaction device, (ii) a folded air bag connected to the reaction device, (iii) an inflator, or gas generator, connected to the reaction device, and (iv) a cover connected to the reaction device to complete an enclosure for the folded air bag. The module is generally coupled with a structural part of the vehicle via the reaction device. In the case of a passenger side air bag module, for example, the reaction device may be coupled with the support structure for the instrument panel of the vehicle. Alternatively, in the case of a driver side air bag module, the reaction device may be coupled with the steering wheel support structure.

When coupled with a vehicle, an air bag module operates to deploy an air bag at the onset of a vehicle collision. Specifically, at the onset of a collision, a chemical mixture in the inflator that forms part of the module is ignited to generate large quantities of gas under relatively high pressure. The gas simultaneously (i) forces the air bag through the cover and (ii) inflates the air bag. As the air bag is being inflated, relatively high forces are applied to the various components of the air bag module. The reaction device transmits such forces to the vehicle structure to stabilize the air bag module during deployment of the air bag.

Over the years, various techniques for forming air bag modules have been suggested. One well known technique comprises initially securing an air bag and an inflator with a reaction device, folding the air bag into a predetermined pattern relative to the inflator and the reaction device, and then attaching a cover to the reaction device. The reaction device is adapted to be coupled with a structural part of the vehicle, to couple the module with the vehicle. One example of such a technique is shown in U.S. Pat. No. 4,148,503, wherein an air bag module comprises an inflator and an air bag secured to a reaction device or bracket arranged at a central part of a steering wheel and secured to a steering wheel spoke. The air bag is arranged to surround the inflator and is then received in a folded condition within a receiving case or cover. Another example of such a technique is shown in U.S. Pat. No. 4,842,300, wherein an air bag module comprises an inflator and an air bag secured within a reaction device. The air bag is folded into a predetermined pattern within the reaction device relative to the inflator, and a cover is then attached to the reaction device to complete the module.

Another known technique for forming an air bag module is to initially form a subassembly comprising a reaction device, a folded air bag and a cover, and to secure an inflator to the subassembly to complete the module. The subassembly is formed by folding the air bag into a predetermined configuration, and securing and closing the air bag within a covered reaction device to complete the subassembly. The inflator is then secured to the subassembly to complete the air bag module. This technique minimizes the handling of inflators in assembling the module. Also, it enables inflators to be transported separately from the subassembly. Thus, if the chemical mixture in the inflators is accidentaly ignited during transport, the subassemblies of the modules are not destroyed. An example of such a technique is shown in U.S. Pat. No. 4,153,273.

As seen from the foregoing discussion, the reaction device performs several important functions in an air bag module. The reaction device connects the module to a structural portion of the vehicle and, during air bag deployment, transmits forces from the air bag module to the vehicle. Further, the reaction device is the element of the module to which virtually all other components of the module (i.e., inflator, air bag and cover) are connected. Thus, the reaction device integrates the other air bag module components into a structural unit.

In the air bag industry, new and useful techniques for forming air bag modules are becoming increasingly important. Air bag modules are currently being installed in large numbers of automobiles. The number of air bag modules installed in the future will continue to increase, as consumer demand and federal regulatory requirements for vehicle safety also continue to increase. To enable auto makers to meet this growing demand, there is a continuing need for simple and effective techniques which lend themselves to the mass production of air bag modules.

Applicants believe there is a continuing need for air bag module structures and assembly techniques which allow inflators to be manufactured and transported separately from the remaining parts of the modules, and incorporated into the modules as the last step in the assembly process. This minimizes the risk of damage to the remaining parts of the modules, due to accidental ignition of an inflator.

SUMMARY OF THE PRESENT INVENTION

The present invention provides a new and useful air bag module structure and new and useful techniques for forming an air bag module. The invention provides an air bag/cover subassembly and an inflator/reaction device subassembly which are coupled together to form an air bag module. The subassemblies are separately assembled, and can be separately transported, to minimize the handling of inflators as compared to an assembly process in which inflators are one of the first components of an air bag module to be incorporated into the module. The subassemblies are designed to be relatively simple and efficient to construct and assemble. Further, the subassemblies are formed using relatively few parts, and are particularly designed with a view toward the mass production of air bag modules.

The air bag/cover subassembly is formed by prefolding an air bag and then coupling the prefolded air bag with a cover. The cover defines an air bag cavity, and has an access opening with an integral peripheral rim. The prefolded air bag is inserted through the access opening and is located within the air bag cavity. The cover is flexible and can be flexed elastically, if necessary, to enable the prefolded air bag to be inserted through the access opening. The prefolded air bag has a gas inlet opening bordered by a portion of the air bag which is designed to be coupled with the rim of the cover, to couple the prefolded air bag with the cover. The border portion of the air bag and the rim on the cover each have attachment openings which are aligned with one another to enable the air bag to be attached to the cover, preferably by fasteners which extend through such aligned openings.

The inflator/reaction device subassembly comprises an inflator housing which is adapted to contain a gas generating device, and a reaction device which is integrally connected with the outside of the inflator housing. Preferably, the inflator housing and the reaction device comprise a single, one-piece member, which is impact extruded from aluminum. The inflator housing has gas dispensing nozzles through which gas is directed when the gas generating device is ignited. The reaction device is formed with attachment openings which align with the aligned attachment openings in the border portion of the air bag and the rim of the cover in the air bag/cover subassembly. The air bag/cover subassembly can be readily coupled with the inflator/reaction device subassembly by coupling the aligned attachment openings, preferably by using some of the same fasteners which couple the air bag with the cover.

When the air bag/cover subassembly is coupled with the inflator/reaction device subassembly, the gas dispensing nozzles in the inflator housing are disposed in fluid communication with the gas inlet opening of the air bag. Thus, when the gas generating compound within the inflator is ignited, gas is directed through the nozzles and into the gas inlet opening in the air bag to inflate the air bag.

The air bag/cover subassembly and the inflator/reaction device subassembly are designed to be separately formed and transported, and then coupled together as the last step in the formation of the module. Thus, the dangers involved in the handling and transportation of live inflators are believed to be minimized.

The resulting air bag module comprises the air bag/cover subassembly fastened to the inflator/reaction dvice subassembly. Moreover, the same fasteners which couple the subassemblies together to form the module can also be used to couple the air bag module to the vehicle. Thus, the installation of the air bag module within the vehicle is also simple and efficient. Applicants believe the air bag module and the techniques used to form the module components and subassemblies are particularly suited for efficient and effective mass production of air bag modules.

Further features and advantages of the present invention will become further apparent from the following detailed description and the accompanying drawings.

Figure 2:
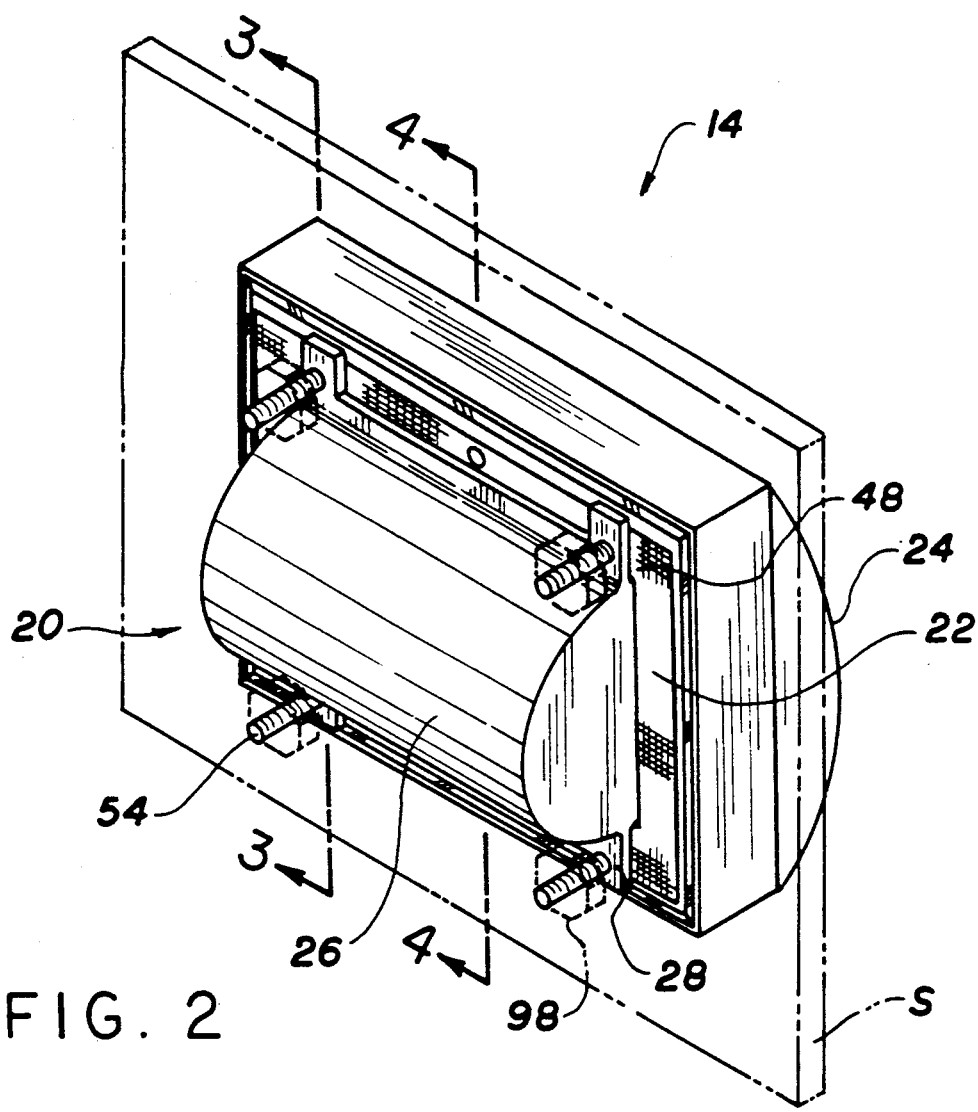
FIG. 2 is a three-dimensional illustration of an air bag module constructed according to the principles of the present invention, taken at an angle from the rear side of the air bag module.
Figure 5:
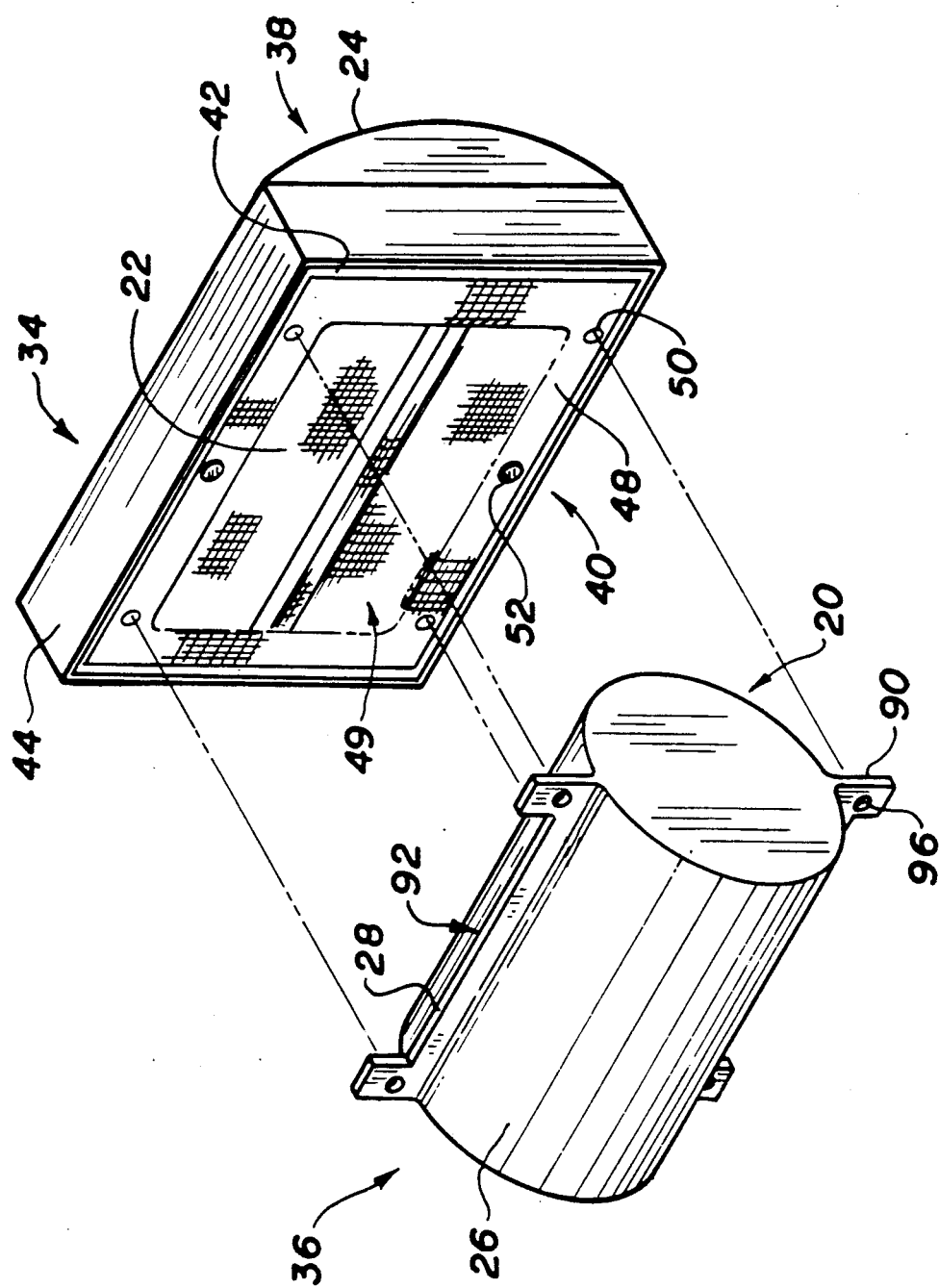
Figure 6:
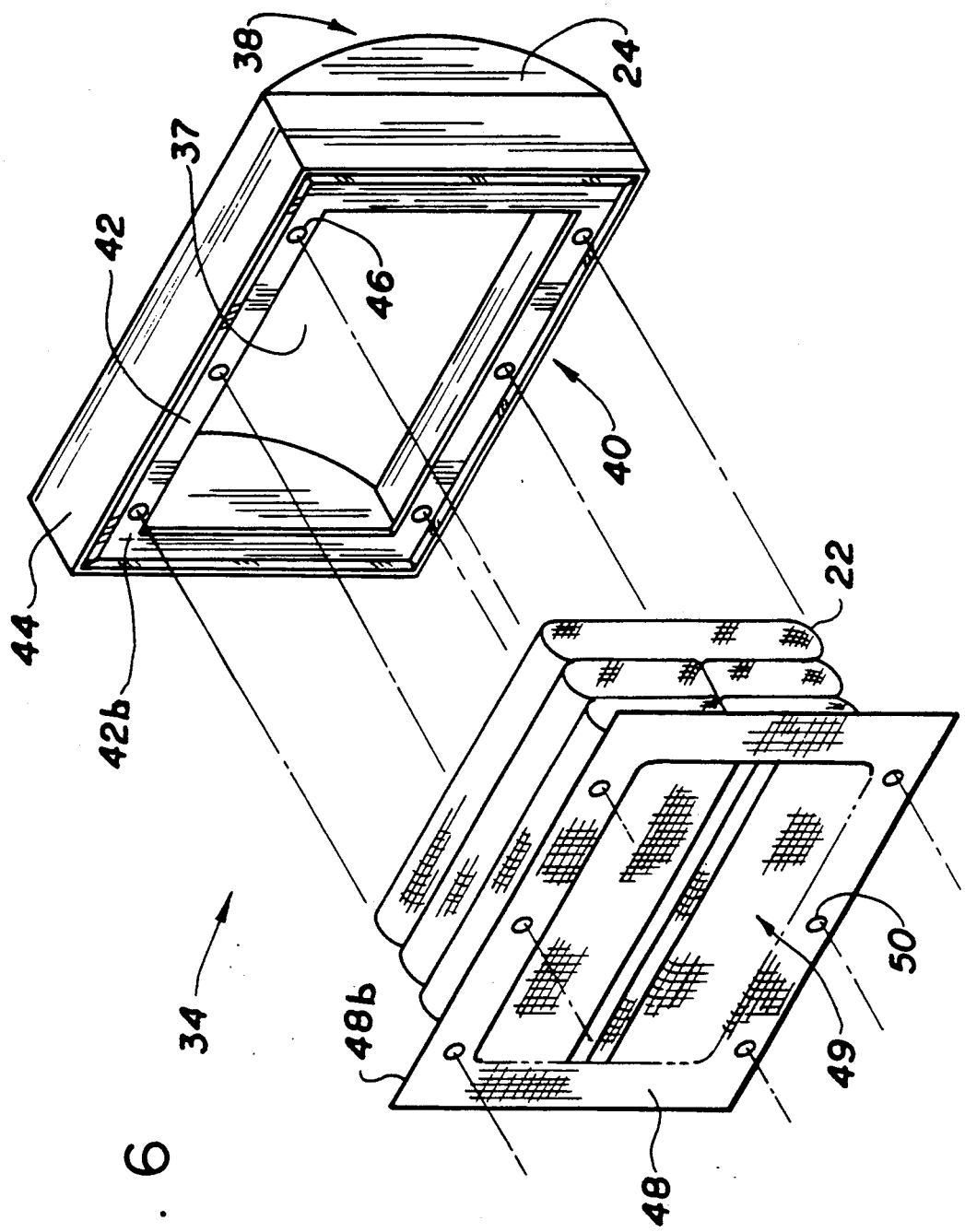
Figure 7:
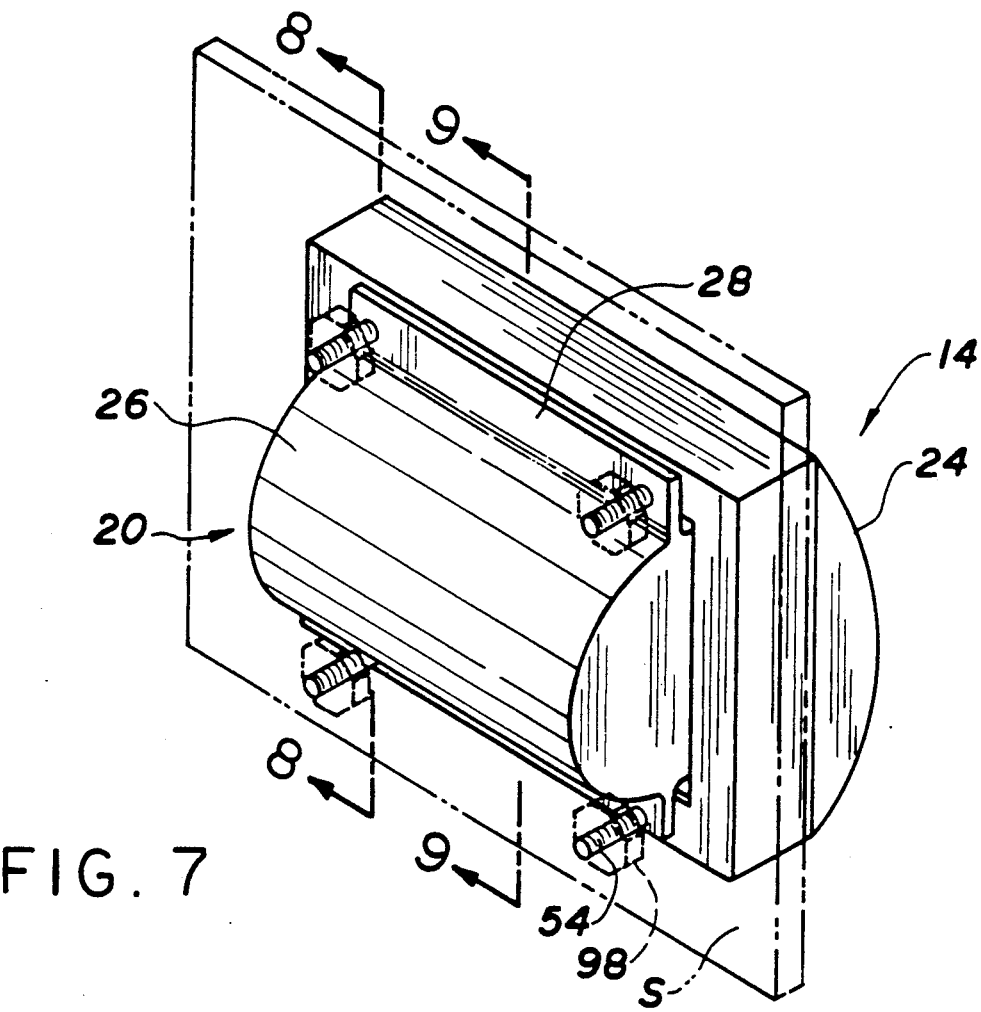
Figure 9:
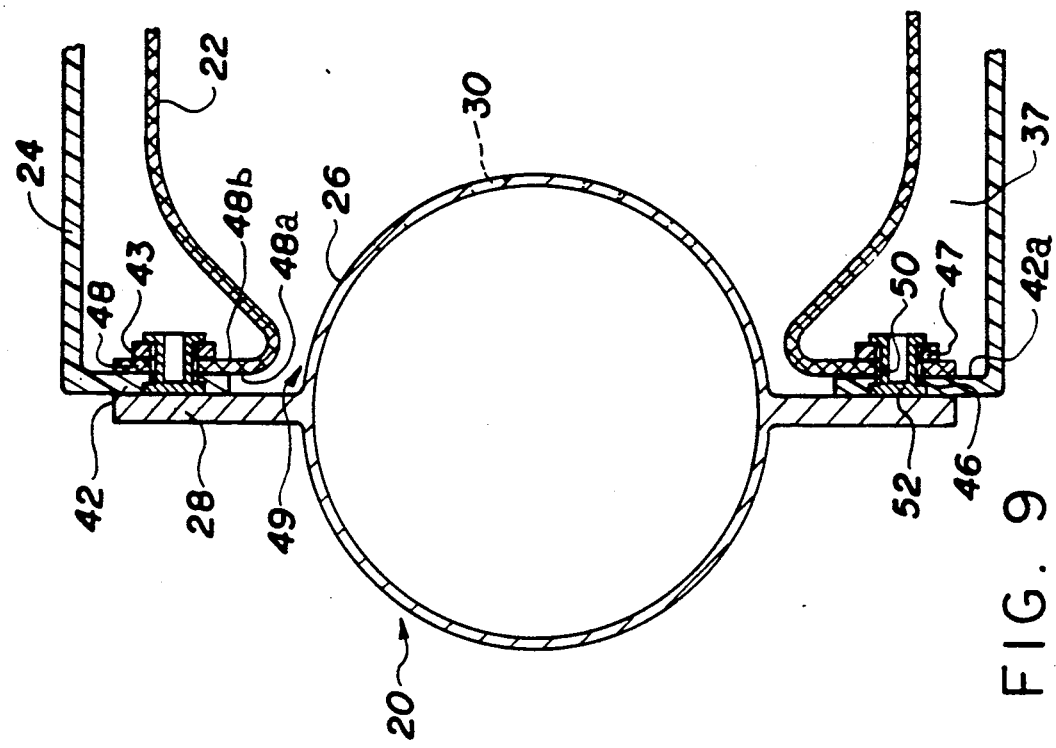
Figure 8:
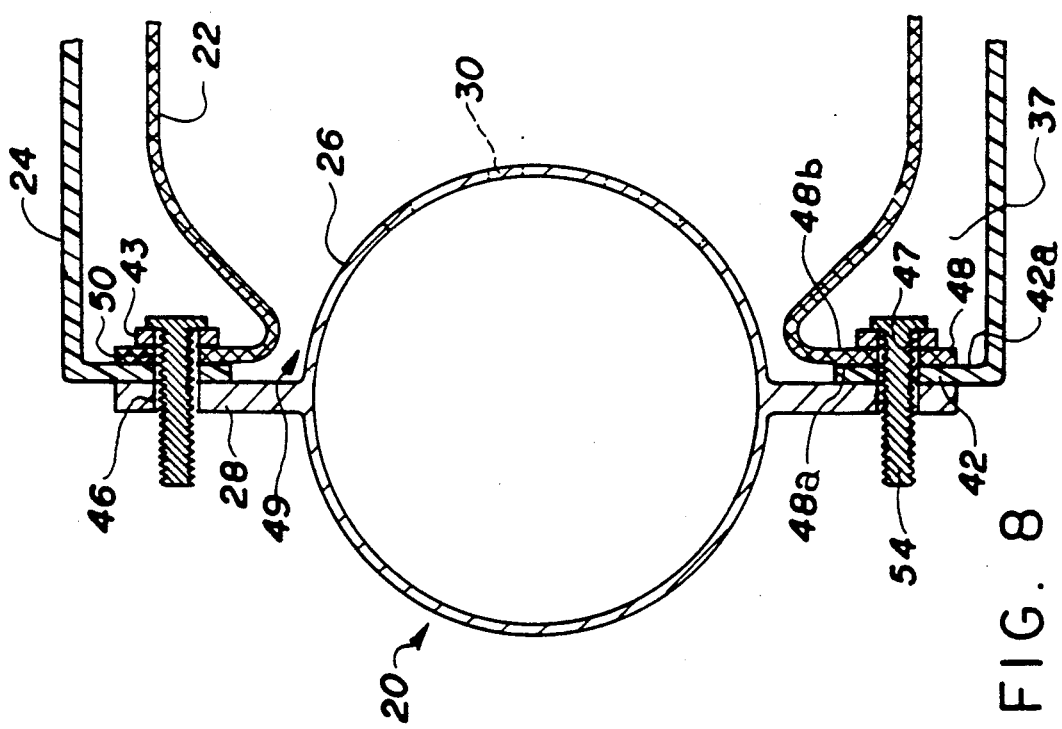
Figure 10:
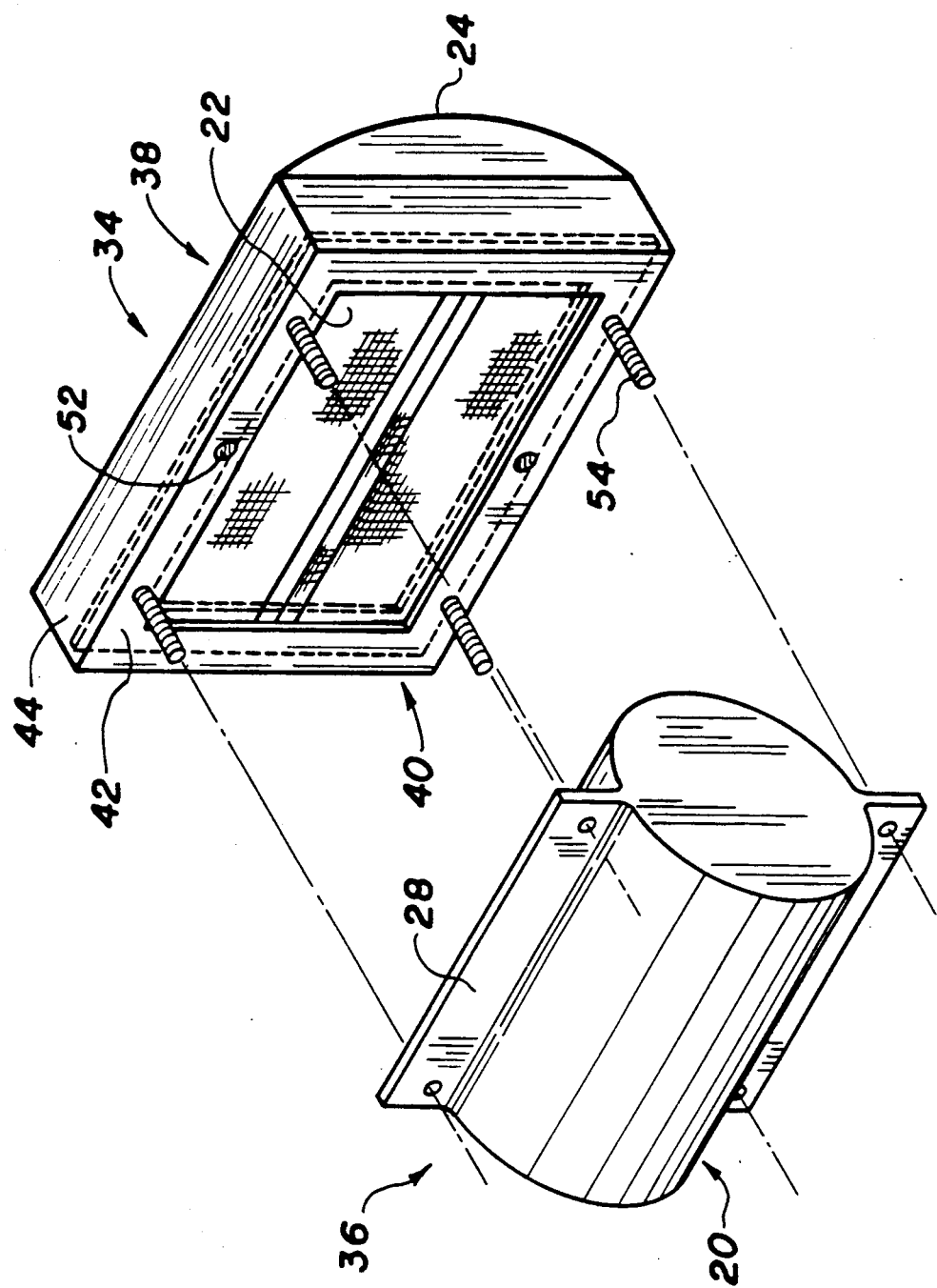
Figure 11:
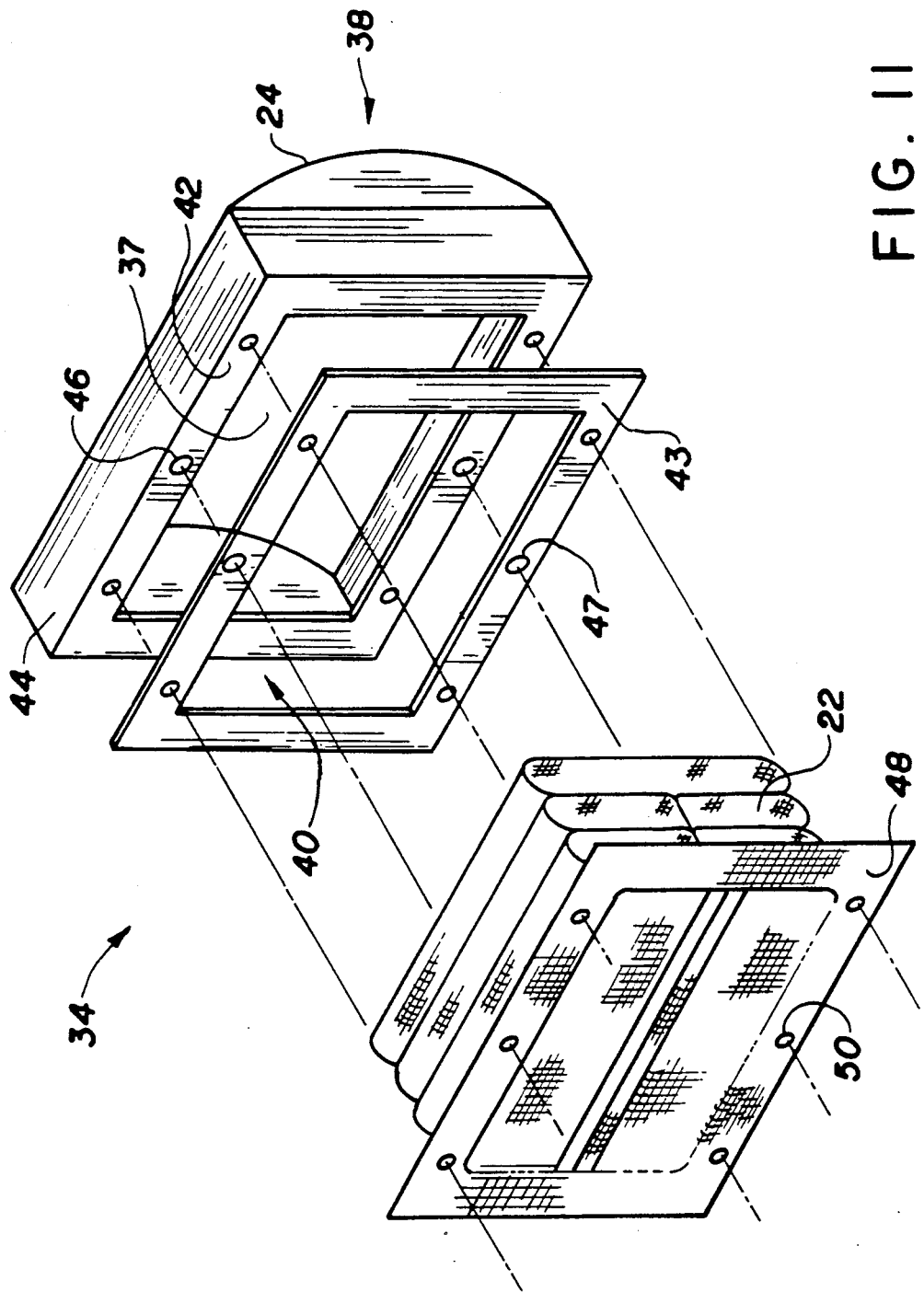
Figure 12:
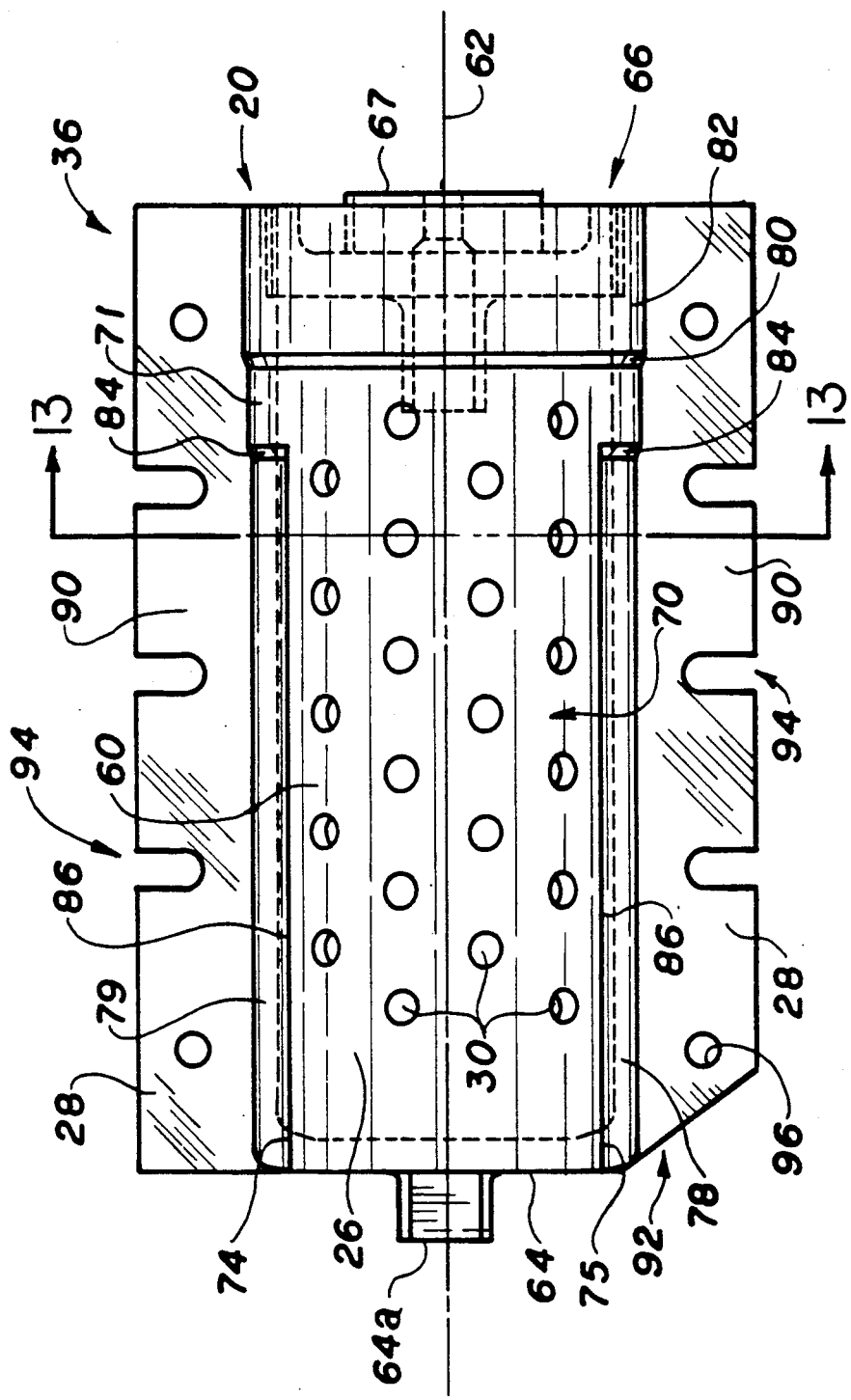
Figure 13:
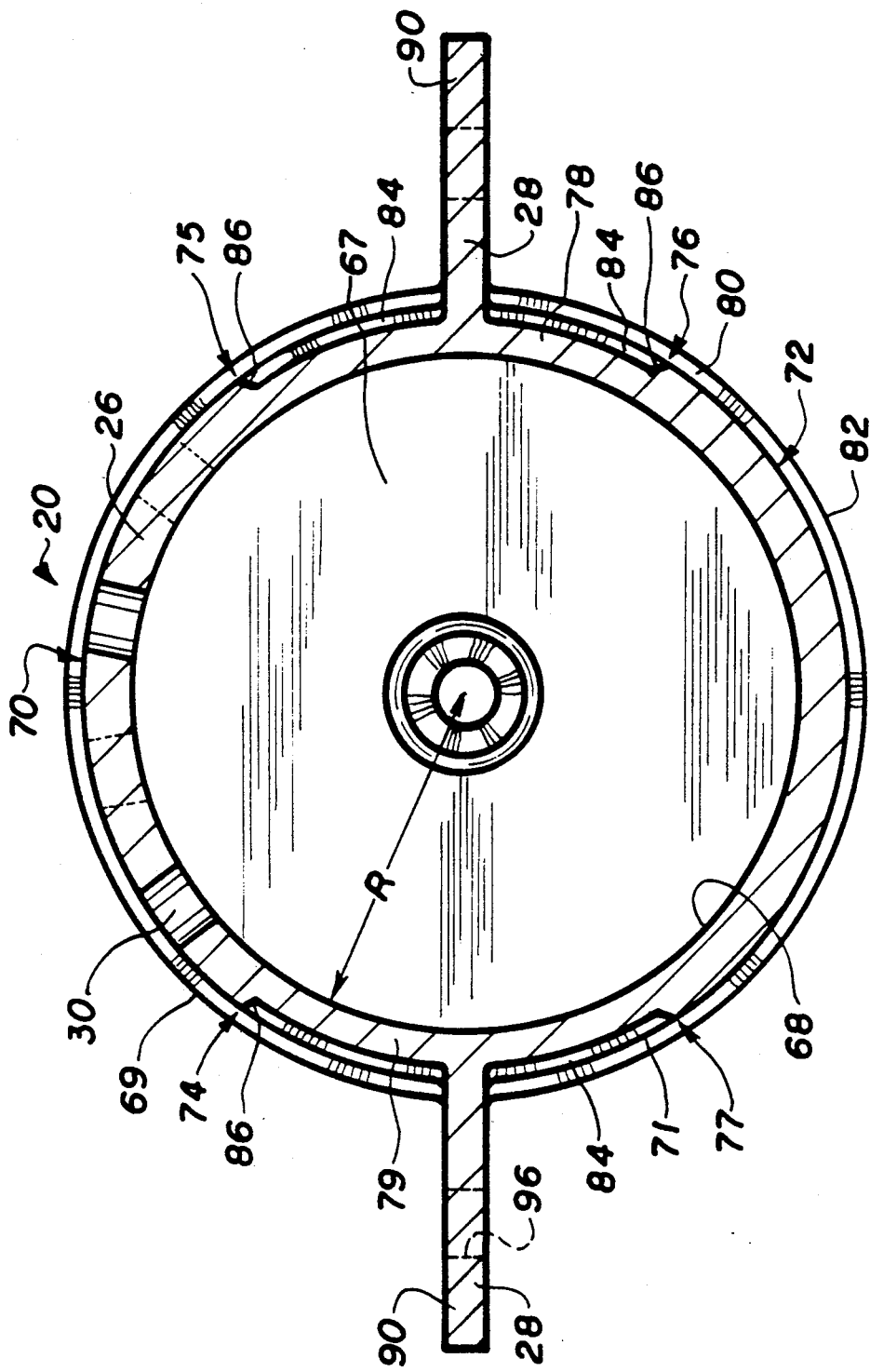

FIG. the 4 is a sectional view of the air bag module of FIG. 2, taken along the plane 4—4;

FIG. 5 is an exploded perspective view of the air bag/cover and inflator/reaction device subassemblies of an air bag module constructed according to the principles of the present invention;

FIG. 6 is an exploded view of the elements forming the air bag/cover subassembly;

FIG. 7 is a perspective view of an alternate form of the air bag module constructed according to the principles of the present invention, taken at an angle from the rear side of the air bag module;

FIGS. 8 and 9 are fragmentary, sectional views of the air bag module of FIG. 7, taken along the planes 8—8 and 9—9, respectively;

FIG. 10 is an exploded view of the air bag/cover and inflator/reaction device subassemblies forming the air bag module of FIG. 7;

FIG. 11 is an exploded view of the components forming the air bag/cover subassembly in the air bag module of FIG. 7;

FIG. 12 is a side elevational view of a preferred version of an inflator/reaction device subassembly of an air bag module constructed according to the principles of the present invention; and FIG. 13 is a sectional view of the inflator/reaction device subassembly of FIG. 12, taken along the plane 13—13 of FIG. 12.

DETAILED DESCRIPTION OF THE PREFERRED EMBODIMENT

Figure 1:
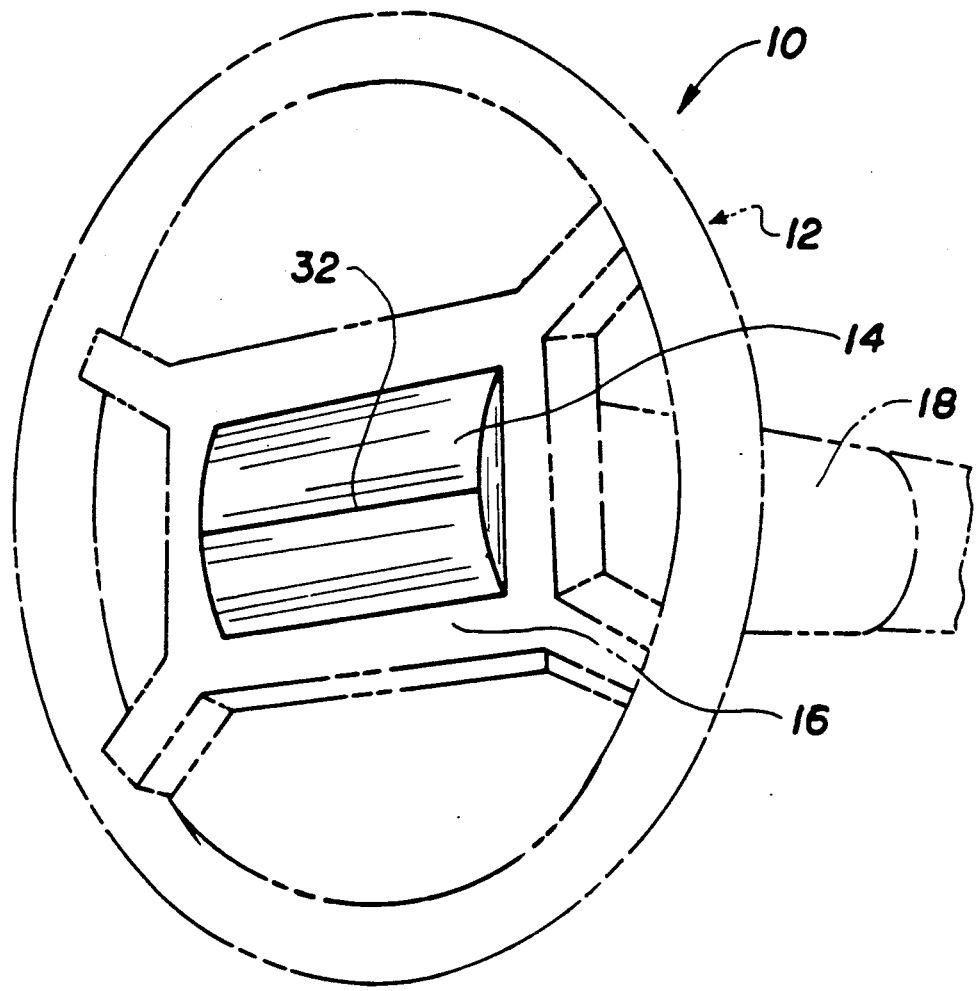
FIG. 1 is a schematic, three-dimensional illustration of a vehicle steering wheel (in phantom) to which an air bag module constructed according to the principles of the present invention is connected thereto.

FIG. 1 schematically illustrates a driver side vehicle air bag system 10. The system is mounted on a vehicle steering wheel 12 and includes an air bag module 14, constructed according to the principles of the present invention. The steering wheel 12 has a central yoke 16 which is coupled with a steering column 18 by means (not shown) which are well known in the art. The air bag module 14 is located in the center of the yoke 16, and is secured to a structural portions of the steering wheel column 18. When located in the center of the yoke 16, the air bag module 14 is in position to deploy an air bag in a manner which will prevent a driver from striking the steering wheel of the vehicle in the event of a collision.

Figure 4:
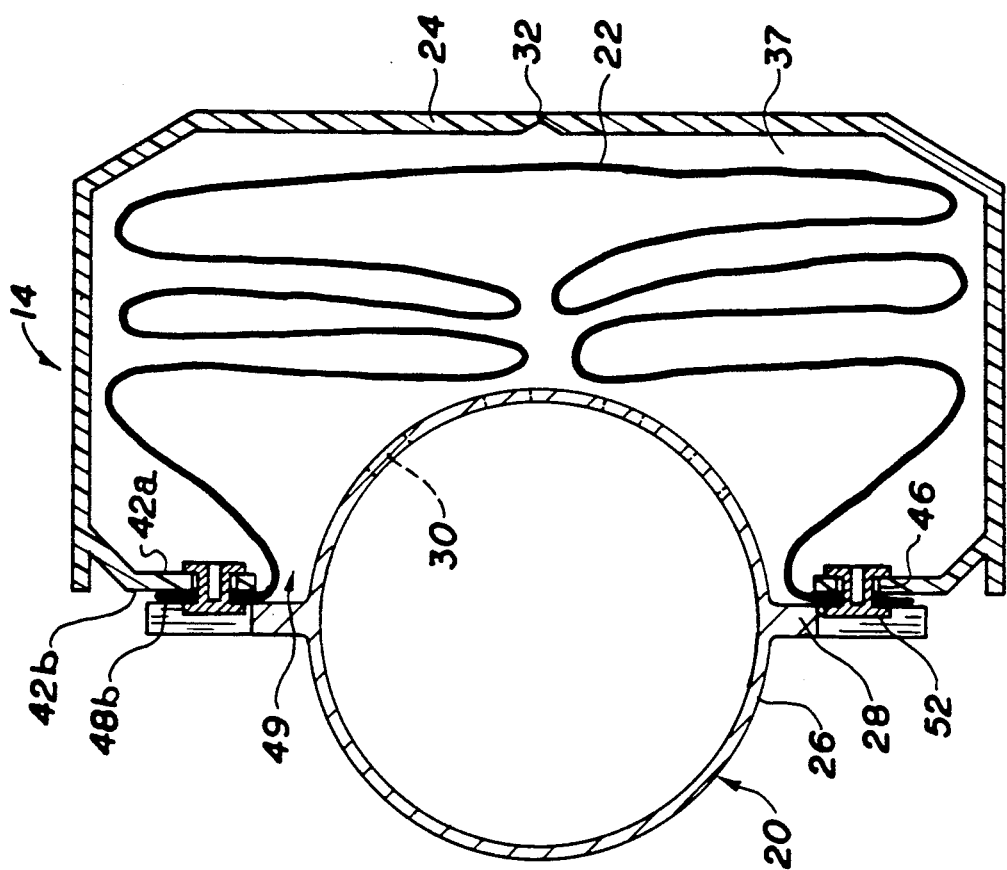

The air bag module 14 is shown in FIGS. 2, 4 and 7. The air bag module 14 is a self-contained unit the primary components of which include a gas generator or inflator 20, a folded air bag 22, a reaction device 28, and a cover 24 which encloses the folded air bag and engages at least part of the reaction device 28. The inflator 20 includes an inflator housing 26 that is formed in one piece with reaction device 28. By forming the reaction device 28 in one piece with the inflator housing 26, the present invention further reduces the number of parts used in the air bag module and thereby additionally reduces module weight. The inflator housing 26 is preferably formed as a cup-like member whose construction is similar to that illustrated in U.S. patent application Ser. No. 07/322,079, which is assigned to the assignee of the present application. The inflator housing 26 defines a central cylindrical cavity 27 which contains a gas generating composition or a sealed container of inert, pressurized gas. Gas dispensing nozzles 30 are formed in the housing 26 and are disposed in fluid communication with the interior of the air bag 22 when the air bag module is assembled.

The gas generating composition can have any of several compositions which are well known to those of ordinary skill in the art, and thus require no further explanation. One such composition is described in U.S. Pat. No. 4,817,828. In an emergency situation, the gas generating composition inside the inflator 20 is ignited by means of an ignition mechanism which forms no part of this invention. Alternatively, if a container of presurized gas is used, the container is pierced or otherwise opened to release the gas in an emergency situation. The gas generated within the inflator is dispensed through the gas dispensing nozzles 30 into the interior of the air bag. The pressure of the gas on the air bag causes the air bag to expand and split the cover 24 to allow deployment of the air bag into the vehicle compartment in front of the steering wheel 10. The cover 24 has appropriate score lines 32, which are also well known in the art, to facilitate splitting of the cover 24 and deployment of the air bag 22 through the cover 24 in the event of a collision.

The reaction device 28 of the inflator housing 26 provides the force transmitting coupling between the module 14 and the structural portion S of the steering wheel column. Thus, forces transmitted during inflation of the air bag 22 are applied through the reaction device 28 to the structural portion S of the vehicle.

The air bag module 14 of the present invention is shown in one embodiment in FIGS. 1-6, and in a second, alternate embodiment in FIGS. 7-11. Where the illustrated components of the air bag module embodiments are the same, the same reference numerals are used to reference the components.

The air bag module 14 is constructed of two subassemblies. One subassembly, the air bag/cover subassembly, generally referenced at 34, consists of the folded air bag 22, the cover 24 and fasteners 52, described more fully hereinafter, for connecting the air bag and the cover. The other subassembly, the inflator/reaction device subassembly, generally referenced at 36, consists of the inflator 20 and reaction device 28.

The air bag/cover subassembly 34 of the first embodiment is illustrated in FIG. 6. The cover 24 includes a rectangular main body 44 with a closed end 38 which forms the front cover door that is presented to the passenger compartment of the vehicle. Opposite the end 38 is an acess opening 40 surrounded by a peripheral flange or rim 42 joined to the main body 44. The rim 42 extends generally inward from the main body 44 of the cover, and has an inside surface 42a on the inside of the cover, and an outside surface 42b on the outside of the cover 24. Spaced around the rim 42 are attachment openings 46 for use in securing the air bag 22 to the cover 24. The cover 24 is hollow and defines an air bag cavity 37.

The air bag 22, which may be made of porous, woven fabric or an impermeable material, such as plastic film, is formed with a gas inlet opening 49, through which gas generated by the inflator 20 passes during operation of the module 14. The portion 48 of the air bag 22 which borders the opening 49 is a continuous portion of the bag fabric and may be reinforced if desired. Spaced around the bag portion 48 are attachment openings 50, designed for alignment with the respective attachment openings 46 in the rim 42 of the cover 24.

To form the air bag/cover subassembly 34 of the first embodiment, the air bag 22 is initially folded (i.e., prefolded) to a desired predetermined configuration outside the cover, as illustrated in FIG. 6. The prefolded air bag is then inserted as a unit into the air bag cavity 37 defined within the cover 24 so that only the border 48 of the bag is exposed. The cover is made of a relatively flexible plastic, such as polyvinylchloride, which allows the cover to be resiliently and elastically deformed, if necessary, to accept the prefolded air bag to be inserted into the air bag cavity. Once the prefolded air bag 22 has been inserted into the cover 24, one surface 48b of the border portion 48 of the air bag is engaged with the outside surface 42b of the rim 42 of the cover so that the openings 50 in the air bag portion 48 are aligned with the openings 46 in the rim of the cover.

Figure 3:
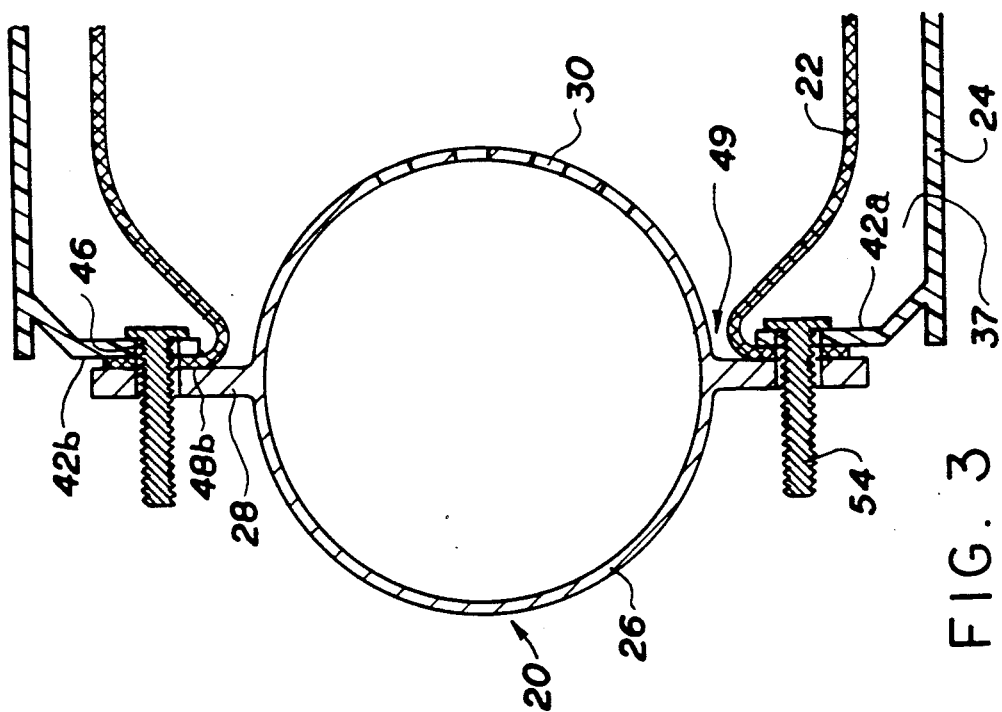
FIG. 3 is a fragmentary, sectional view of the air bag module of FIG. 2, taken along the plane 3—3.

Once the attachment openings 46, 50 in the air bag and cover, respectively, are aligned with one another, the air bag 22 is secured to the cover 24. As illustrated in FIG. 4, at least two of the respective attachment openings 46, 50 are adapted to accept individual rivets 52, which function exclusively to connect the air bag with the cover. Retaining bolts 54, as illustrated in FIG. 3, are inserted into the remaining aligned openings 46, 50 to secure the air bag to the cover and, as will be described hereinafter, the air bag/cover subassembly 34 to the inflator/reaction device subassembly 36.

To form the air bag/cover subassembly 34 of the second embodiment, as illustrated in FIG. 7-11, a retaining ring 43 (see FIG. 11) is engaged with the one side 48b of the border portion 48 of the air bag. With the retaining ring 43 attached to the air bag, in a manner described hereinafter, the air bag is then prefolded and inserted into the air bag cavity 37 so that both the border portion 48 of the bag and the retaining ring are within the cavity. Since the retaining ring is a substantially rigid member, the flexible plastic cover 24 is elastically deformed to encompass the retaining ring and attached air bag. With the retaining ring and air bag positioned inside the cover, the side 48a of the border portion 48 opposite the side 48b is then engaged with the inside surface 42a of the rim 42 of the cover. The air bag is thus captured between the retaining ring 43 and the border rim 42. The attachment openings 47 in the retaining ring 43 are aligned with the openings 50 in the border portion 48 of the air bag and the openings 46 in the rim 42 of the cover 24.

Once the attachment openings 47, 46, 50 in the retaining ring, air bag and cover, respectively, are aligned with one another, the air bag 22 is secured to the cover as described above in connection with the first embodiment of the air bag/cover subassembly. As illustrated in FIG. 8, retaining bolts 54 are used to secure the retaining ring 43 and the air bag 22 to the cover 24 and the air bag/cover subassembly 34 to the inflator/reaction device subassembly 36. As illustrated in FIG. 9, individual rivets 52 are inserted through certain aligned openings 46, 47 and 50 exclusively to connect the retaining ring and air bag with the cover.

In the illustrated embodiments of the air bag module 14 in FIGS. 1-6 and 7-11, the retaining bolts 54 preferably serve the dual function of coupling the components of the air bag/cover subassembly 34 together, and of coupling the inflator/reaction device subassembly 36 with the air bag/cover subassembly. The same retaining bolts additionally serve to couple the module to the structural portion S of the vehicle as described below. By using the same retaining fasteners to perform multiple connecting functions, the air bag module uses a relatively small number of parts. The advantages obtained by reducing the number of parts used in the air bag module, include a reduction in overall module weight and cost.

The inflator/reaction device subassembly 36 is illustrated in FIGS. 5 and 10 in connection with the first and second embodiments of the air bag/cover subassembly. As previously described, this subassembly consists of the inflator 20 and the reaction device 28, which is preferably formed in one piece with the inflator housing 26. The inflator housing is cylindrical, which means it either has a completely cylindrical outer wall or a generally cylindrical outer wall with a thickness that varies from point to point about a longitudinal central axis. The specific preferred embodiment of the inflator 20 of the present invention includes a cylindrical inflator housing 26 having an outer wall with variable thickness.

As illustrated in FIGS. 12 and 13, the inflator housing has a main wall 60 circumscribing a longitudinal central axis 62, and an end wall 64 formed in one piece with one longitudinal end of the main wall 60. The other longitudinal end of the main wall defines an opening 66. An end cap 67 is attached to the main wall 60 to close the opening 66 after the gas generating composition has been inserted into the inflator housing to complete the inflator 20.

The main wall 60 of the inflator housing 26 has an inside surface 68 and an outside surface 69. The inside surface 68 has generally constant diameter, while the outside surface has a diameter that varies to provide a relatively complex surface geometry, as described hereinafter. The gas dispensing nozzles 30 extend radially through the main wall 60 of the housing. The gas dispensing nozzles are located in a nozzle area, generally referenced at 70, extending longitudinally along a selected part of the main wall 60. The nozzle area partially circumscribes the longitudinal axis 62, i.e. it extends over a selected circumferential portion of the main wall 60. Moreover, the nozzle area 70 in the main wall 60 has a substantially constant thickness. In a driver side inflator of the preferred embodiment, the length of the nozzle area 70 is slightly less than that of the main wall 60.

Another portion of the main wall 60 defines a reaction area, 72. The thickness of the main wall 60 in the reaction area 72 is preferably the same as the thickness of the main wall in the nozzle area 70. Moreover, an annular segment 71 of the main wall 60 has the same thickness as the nozzle and reaction areas 70, 72, and both joins and forms part of each of the nozzle and reaction areas. The length of the reaction area 72 is approximately coextensive with the nozzle area 70 along the longitudinal axis 62. The reaction area 72 extends over a selected circumferential portion of the main wall 60 disposed diametrically the nozzle area 70. As shown in FIG. 13, one longitudinally opposite extending edge 74 of the nozzle area 70 extends longitudinally opposite one longitudinally extending edge 76 of the reaction area 72, and the other longitudinally extending edge 75 of the nozzle area extends longitudinally opposite the other longitudinally extending edge 77 of the reaction area. Thus, the reaction area 72, which extends between its longitudinal edges 76, 77 is diametrically opposite to the nozzle area 70 which extends between its longitudinal edges 74, 75.

Other portions of the main wall include connecting areas 78, 79. The connecting areas extend between the nozzle and reaction areas. The connecting areas are coextensive along the longitudinal axis 72, and the length of each of the connecting areas is slightly less than the lengths of the nozzle and reaction areas. The connecting areas are substantially equal in thickness.

The thickness of the main wall 60 in the nozzle and reaction areas 70, 72 is greater that the thickness of the main wall 60 in the connecting area 78, 79. During operation of the inflator 20, gas is generated and is expelled through the nozzles 30. The pressure of the gas, and the thrust forces produced as the gas is expelled, act on the main wall of the inflator housing. The main wall is relatively thick in the nozzle and reaction ares of the main wall to withstand the gas pressures and thrust forces applied. The main wall is relatively thin in the connecting areas 78, 79, to minimize the weight of the inflator 20. Since the main wall is continuous in the connecting areas, the main wall can be thinner in the connecting areas, without compromising the ability of the main wall to withstand the gas pressures and thrust forces applied during operation of the inflator. According to the preferred embodiment, the thickness of the main wall is approximately 3.72 millimeters in each of the nozzle and reaction areas 70, 72, and approximately 3.05 millimeters in each of the connecting areas 78, 79.

In order for the inflator housing to have an inside surface 68 with a constant diameter and the variable wall thickness described, the outside surface 69 of the main wall 60 has a relatively complex, geometric profile. Specifically, the outside surface has an annular sloping surface portion 80 extending between the thick wall portion 82 adjacent the opening 66 and the nozzle and reaction areas 70, 72. The outside surface 69 also has sloping portions 84, 86 extending between the annular segment 71 and the connecting portions 78, 79 and between the nozzle and reaction areas 70, 72 and the connecting areas, respectively. In the preferred embodiment, the sloping portion 80 forms a circumferentially extending discrete step between the thick wall portion 82 and the annular segment 71. The sloping portions 84 partially circumscribe the longitudinal axis 62 and define additional discrete steps between the annular segment 71 and the connecting areas 78, 79. The sloping portions 86 define discrete longitudinally extending steps between the nozzle and reaction areas 70, 72 and the connecting portions 78, 79. Each of the sloping portions 80, 84 circumscribing the longitudinal axis 22 slopes at an angle of about 52 degrees relative to the longitudinal axis 62. The longitudinally extending sloping portions 86 slope at an angle of about 45 degrees relative to the radius R of the main wall 20.

The reaction device 28 consists of substantially coplanar plate portions or flanges 90 integrally formed with the cylindrical inflator housing. The flanges 90 extend radially outward from the connecting areas 78, 79. As shown in FIG. 13, the flanges are formed at diametrically opposed points on the connecting areas of the inflator housing. In FIG. 5, the top flange 90 forms two fingers 100, and the bottom flange forms fingers 102. Fingers 100 are separated by gap 104; while fingers 102 are separated by a gap 106. The coplanar flanges are preferably about 3.05 millimeters thick, and at a minimum are at least as thick as the thin wall of the connecting areas. This minimum thickness is preferred in order to provide the reaction device 28 with adequate resistance against the gas pressures and thrust forces applied during operation of the module.

As illustrated in FIGS. 3, 5, 8, 10, 12 and 13, the flanges of the reaction device have attachment openings 96. These openings are designed to be aligned with the corresponding aligned attachment openings in the air bag/cover subassembly 34. In FIG. 5, these attachment openings 96 are located on the fingers 100 and 102. In the embodiments of the reaction device shown in FIGS. 2, 5, and 12, the flanges have portions, generally referenced at 92, cut away adjacent the end wall 64 of the inflator housing. Additionally, U-shaped cut away portions 94 are also provided. These portions 94 are cut away from the flanges to provide for aspiration of ambient air into the air bag 22 during operation of the air bag module 14, as may be necessary for proper air bag module operation. Portions of the flanges are also removed, as appropriate, for retaining enough of the flanges to enable them to function properly during module operation. The removal of material can be performed by any conventional machining or stamping processes.

According to the preferred embodiment of the present invention, the inflator housing 26 is cold formed by impact extrusion. The preferred material is 2014 aluminum, which is lightweight, high strength aluminum and well known as a material that can be readily formed by conventional impact extrusion. The techniques for impact extruding a cup-like container having radial flanges such as the inflator housing and reaction device are well known. To obtain the corresponding complex geometry of the outside surface of the inflator housing, the end wall 64, a boss 64A, and the flanges 90 are extruded in one piece with the main wall 60. The die for the extrusion is preferably a solid, single piece die with a profile matching the outside surface of the inflator housing, including the steps 82, 84, 86 and the flanges 90. Alternatively, the die can comprise a sleeve and holder, with the inside profile of the sleeve matching the steps and flanges. Such die forms are well known to those in the aluminum fabricating arts. The extrusion is preferably accomplished by reverse extrusion, which is a well known technique for impact extruding aluminum.

In the air bag module constructed according to the principles of the present invention, the air bag/cover subassembly and the inflator/reaction member subassembly 36 are separately formed. One advantage of separately forming the subassemblies is that they can be separately stored and transported to a module assembly location or module installation location. Transportation of inflators separate from other materials is advantageous in the event of an accident which ignites the gas generating composition in the inflators. Additionally, attachment of the inflator/reaction device subassembly 36 to the air bag/cover subassembly after the fabrication of the air bag/cover subassembly tends to minimize handling of the inflator and thereby minimizes the risk of accidental ignition of an inflator.

The air bag/cover subassembly and the inflator/reaction device subassembly are assembled together by aligning the attachment openings 96 in the flanges 90 of the reaction device 28, with the aligned attachment openings in the air bag/cover subassembly, and securing them together by means of the retaining bolts already securing the air bag/cover subassembly. This completes the air bag module 14. As illustrated, the retaining bolts 54 extend beyond the reaction device 28, and therefore, are capable of securing the air bag module 14 to the structural portions of the vehicle. This is accomplished by securing the nuts 98, shown in phantom in FIGS. 2 and 7, to the bolts engaged with the structural portions of the vehicle. When secured together, the reaction device is in direct contact with the air bag/cover subassembly, and the gas dispensing nozzles 30 are in fluid communication with the gas inlet opening 49 defined by the mouth of the air bag 22. In this position, gas dispensed from said nozzles 30 during operation of the air bag module 14 is provided through said inlet opening 49 and into the air bag 22.

Accordingly, an air bag module has been described above which may be secured to the vehicle structural portion without the use of an additional reaction can, or other intermediate structural or attachment devices. Further, the air bag module described above has two subassemblies, an air bag/cover subassembly and an inflator/reaction device subassembly. The preferred form of the inflator/reaction device subassembly has been described as including an inflator housing formed of aluminum by known cold forming techniques with an integral reaction device extending outward of the inflator housing. However, with the present disclosure in mind, it is believed that obvious alternatives to the preferred embodiment, to achieve comparable advantages in other air bag modules, will become apparent to those of ordinary skill in the art.

We claim:

1. Apparatus comprising:
an air bag/cover subassembly, and
an inflator/reaction device subassembly which is adapted to be coupled to said air bag/cover subassembly to form an air bag module,
said air bag/cover subassembly comprising a cover defining an air bag cavity in said cover and a folded air bag disposed within said air bag cavity, said cover having an access opening and a rim surrounding said access opening and said air bag having a gas inlet opening and a border portion surrounding said inlet opening, the border portion of said air bag being secured to the rim of said cover,
said inflator/reaction device subassembly comprising an inflator housing having gas dispensing nozzles, means for producing gas disposed within said inflator housing, and a reaction device integral with and extending outwardly of said inflator housing,
said reaction device being adapted to be coupled to said rim of said cover and the border portion of said air bag to couple said inflator/reaction device subassembly with said air bag/cover subassembly, and
said inflator housing being adapted to be disposed with said gas dispensing nozzles in fluid communication with said gas inlet opening in said air bag when said inflator/reaction device subassembly is coupled with said air bag/cover subassembly;
said apparatus further comprising a plurality of fasteners, said border portion of said air bag having a plurality of openings therein and said rim of said cover having corresponding openings therein, the openings in said border portion of said air bag adapted to be aligned with the openings in the rim of said cover, said fasteners extending through said aligned openings in said border portion of said air bag and said rim of said cover to connect said border portion of said air bag with said border rim of said cover,
said reaction device having openings adapted to be aligned with at least some of the aligned openings in said rim of said cover and said border portion of said air bag to enable at least some of the fasteners connecting said rim of said cover with said border portion of said air bag to couple said inflator/reaction device subassembly with said air bag/cover subassembly;
said rim of said cover having an inside surface presented to said air bag cavity and an outside surface forming part of the outside of said cover, said border portion of said air bag being disposed against said outside surface of said rim of said cover, said reaction device being adapted to be coupled to said rim with said border portion of said air bag captured between said reaction device and said outside surface of said rim.

2. Apparatus as set forth in claim 1 wherein said air bag comprises a prefolded unit which has been folded outside of said air bag cavity and inserted as a folded unit into said air bag cavity, said cover having sufficient flexibility to enable the cover to be elastically flexed as said folded air bag unit is being inserted into said air bag cavity.

3. Apparatus as set forth in claim 2 wherein said inflator housing has a substantially cylindrical configuration, and said reaction device comprises a pair of substantially coplanar plate sections extending away from diametrically opposed portions of said substantially cylindrical inflator housing.

4. Apparatus comprising:
an air bag/cover subassembly, and
an inflator/reaction device subassembly which is adapted to be coupled to said air bag/cover subassembly to form an air bag module,
said air bag/cover subassembly comprising a cover defining an air bag cavity in said cover and a folded air bag disposed within said air bag cavity, said cover having an access opening and a rim surrounding said access opening and said air bag having a gas inlet opening and a border portion surrounding said inlet opening, the border portion of said air bag being secured to the rim of said cover,
said inflator/reaction device subassembly comprising an inflator housing having gas dispensing nozzles, means for producing gas disposed within said inflator housing, and a reaction device integral with and extending outwardly of said inflator housing,
said reaction device being adapted to be coupled to said rim of said cover and the border portion of said air bag to couple said inflator/reaction device subassembly with said air bag/cover subassembly, and
said inflator housing being adapted to be disposed with said gas dispensing nozzles in fluid communication with said gas inlet opening in said air bag when said inflator/reaction device subassembly is coupled with said air bag/cover subassembly,
said inflator housing having a substantially cylindrical configuration, and said reaction device comprising a pair of substantially coplanar plate sections extending away from diametrically opposed portions of said substantially cylindrical inflator housing,
said inflator housing further having a variable wall thickness, and each of said coplanar plate sections having a thickness at least as great as the thinnest wall thickness of said substantially cylindrical inflator housing.

5. Apparatus as defined in claim 4 wherein said apparatus further comprises a plurality of fasteners, said border portion of said air bag having a plurality of openings therein and said rim of said cover having corresponding openings therein, the openings in said border portion of said air bag adapted to be aligned with the openings in the rim of said cover, said fasteners extending through said aligned openings in said border portion of said air bag and said rim of said cover to connect said border portion of said air bag with said border rim of said cover,
said reaction device having openings adapted to be aligned with at least some of the aligned openings in said rim of said cover and said border portion of said air bag to enable at least some of the fasteners connecting said rim of said cover with said border portion of said air bag to couple said inflator/reaction device subassembly with said air bag/cover subassembly.

6. Apparatus as defined in claim 5 wherein said rim of said cover has an inside surface presented to said air bag cavity and an outside surface forming part of the outside of said cover, said border portion of said air bag being disposed against one of said inside and outside surfaces of said rim of said cover.

7. Apparatus as defined in claim 6 wherein said border portion of said air bag is disposed against the outside surface of said rim of said cover, said reaction device being adapted to be coupled to said rim with said border portion of said air bag captured between said reaction device and said outside surface of said rim.

8. Apparatus as defined in claim 6 wherein said border portion of said air bag is disposed against the inside surface of said rim of said cover, and a retaining ring is disposed against the border portion of said air bag in a manner which captures at least part of said border portion of said air bag between said retaining ring and said inside surface of said rim, said reaction device being adapted to be disposed directly against said outside surface of said rim when said reaction device is coupled with said rim of said cover.

9. Apparatus as set forth in any of claims 4-8 wherein said inflator housing and said reaction device are formed in one piece of cold formed aluminum.

10. Apparatus as set forth in claim 9 wherein said inflator housing and reaction device are formed in one piece of impact extruded aluminum.

11. Apparatus as defined in any of claims 4-8 wherein at least one of said coplanar plate sections is configured to form at least part of an aspiration passage which enables air to be aspirated into said air bag during operation of said air bag module.

12. Apparatus comprising:
an air bag/cover subassembly, and
an inflator/reaction device subassembly which is adapted to be coupled to said air bag/cover subassembly to form an air bag module for a vehicle,
said air bag/cover subassembly comprising a cover defining an air bag cavity in said cover and a folded air bag disposed within said air bag cavity, said cover having an access opening and a rim surrounding said access opening and said air bag having a gas inlet opening and a border portion surrounding said inlet opening, the border portion of said air bag being secured to the rim of said cover,
said inflator/reaction device subassembly comprising an inflator housing having gas dispensing nozzles, means for producing gas disposed within said inflator housing, and a reaction device integral with and extending outwardly of said inflator housing,
said reaction device being adapted to transmit forces to such vehicle from the air bag module during deployment of the air bag,
said reaction device also being adapted to be coupled to said rim of said cover and the border portion of said air bag to couple said inflator/reaction device subassembly with said air bag/cover subassembly, said inflator housing being adapted to be disposed with said gas dispensing nozzles in fluid communication with said gas inlet opening in said air bag when said inflator/reaction device subassembly is coupled with said air bag/cover subassembly, and said inflator housing having a substantially cylindrical configuration, and said reaction device comprising a pair of substantially coplanar plate sections extending away from diametrically opposed portions of said substantially cylindrical inflator housing.

13. Apparatus comprising an air bag/cover subassembly which is adapted to be coupled to an inflator/reaction device subassembly to form an air bag module, said air bag/cover subassembly consisting essentially of (i) a cover defining an air bag cavity and having an access opening communicating with said air bag cavity and a rim, formed in one piece with the remaining portions of said cover, surrounding said access opening, (ii) a folded air bag disposed in said air bag cavity, said air bag having a border portion defining a gas inlet opening, and (iii) means for connecting said portion of said folded air bag with said cover, said means for connecting said portion of said folded air bag with said cover being adapted to connect said portion of said air bag with said rim of said cover.

14. Apparatus as set forth in claim 13 wherein said means for connecting said portion of said folded air bag with said cover comprises aligned openings in said border portion of said air bag and said rim of said cover and fasteners extending through said aligned openings in said border portion of said air bag and said rim.

15. Apparatus as set forth in claim 14 wherein said rim has an inside surface presented to said air bag cavity and an outside surface forming part of the outside of said cover, said border portion of said air bag being disposed against one of the inside and outside surfaces of said rim of said cover.

16. Apparatus as defined in claim 15 wherein said border portion of said air bag is disposed against said inside surface of said rim, and said means for connecting said border portion of said air bag with said cover comprises a retaining ring disposed inside of and against said border portion of said air bag so as to capture said border portion of said air bag between said retaining ring and said inside surface of said rim, said retaining ring having openings aligned with said aligned openings in said border portion of said air bag and in said rim of said cover; and said fasteners extending through the aligned openings in said retaining ring, said border portion of said air bag and said rim of said cover.

17. Apparatus as defined in any of claims 13-15 and 16 wherein said air bag comprises a prefolded air bag unit and said cover has a flexibility which enables said cover to be elastically flexed to enable said prefolded air bag to be inserted into said air bag cavity.

18. Apparatus comprising an air bag/cover subassembly which is adapted to be coupled to an inflator/reaction device subassembly to form an air bag module, said air bag/cover subassembly consisting essentially of (i) a cover defining an air bag cavity and having an access opening communicating with said air bag cavity and a rim surrounding said access opening, (ii) a folded air bag disposed in said air bag cavity, said air bag having a border portion defining a gas inlet opening, and (iii) means for connecting said portion of said folded air bag with said cover, said means for connecting said portion of said folded air bag with said cover being adapted to connect said portion of said air bag with said rim of said cover, said means for connecting said portion of said folded air bag with said cover comprising aligned openings in said border portion of said air bag and said rim of said cover and fasteners extending through said aligned openings in said border portions of said air bag and said rim, said rim having an inside surface presented to said air bag cavity and an outside surface forming part of the outside of said cover, said border portion of said air bag being disposed against the outside surfaces of said rim of said cover.

19. Apparatus as defined in claim 18 wherein said air bag comprises a prefolded air bag unit and said cover has a flexibility which enables said cover to be elastically flexed to enable said prefolded air bag to be inserted into said air bag cavity.

20. Apparatus comprising an inflator/reaction device subassembly which is adapted to be coupled to an air bag/cover subassembly to form an air bag module for a vehicle;

said inflator/reaction device subassembly comprising an inflator housing having gas dispensing nozzles, means for producing gas disposed within said inflator housing, and a reaction device formed in one piece with and extending outwardly of said inflator housing;

said reaction device being adapted to transmit forces to such vehicle from the air bag module during deployment of the air bag/cover subassembly;

said reaction device also being adapted to be coupled with the air bag/cover subassembly to couple said inflator/reaction device subassembly with said air bag/cover subassembly;

said inflator housing having a substantially cylindrical configuration, and said reaction device comprising a pair of substantially coplanar plate sections extending away from diametrically opposed portions of said inflator housing.

21. Apparatus comprising an inflator/reaction device subassembly which is adapted to be coupled to an air bag/cover subassembly to form an air bag module;

said inflator/reaction device subassembly comprising an inflator housing having gas dispensing nozzles, means for producing gas disposed within said inflator housing, and a reaction device formed in one piece with and extending outwardly of said inflator housing;

said reaction device being adapted to be coupled with the air bag/cover subassembly to couple said inflator/reaction device subassembly with said air bag/cover subassembly;

said inflator housing having a substantially cylindrical configuration, and said reaction device comprising a pair of substantially coplanar plate sections extending away from diametrically opposed portions of said inflator housing;

said inflator housing and said reaction device being formed in one piece of cold formed aluminum.

22. Apparatus as set forth in claim 21 wherein said inflator housing and reaction device are formed in one piece of impact extruded aluminum.

23. Apparatus as set forth in claims 21 or 22 wherein said inflator housing has a vaariable wall thickness, and said reaction device has thickness at least as great as the thinnest wall thickness of said inflator housing.

24. Apparatus comprising an inflator/reaction device subassembly which is adapted to be coupled to an air bag/cover subassembly to form an air bag module;

said inflator/reaction device subassembly comprising an inflator housing having gas dispensing nozzles, means for producing gas disposed within said inflator housing, and a reaction device formed in one piece with and extending outwardly of said inflator housing;

said reaction device being adapted to be coupled with the air bag/cover subassembly to couple said inflator/reaction device subassembly with said air bag/cover subassembly;

said inflator housing having a substantially cylindrical configuration, and said reaction device comprising a pair of substantially coplanar plate sections extending away from diametrically opposed portions of said inflator housing;

said inflator housing further having a variable wall thickness, and said reaction device having a thickness at least as great as the thinnest wall thickness of said inflator housing.

25. Apparatus comprising an inflator/reaction device subassembly which is adapted to be coupled to an air bag/cover subassembly to form an air bag module;

said inflator/reaction device subassembly comprising an inflator housing having gas dispensing nozzles, means for producing gas disposed within said inflator housing, and a reaction device formed in one piece with and extending outwardly of said inflator housing;

said reaction device being adapted to be coupled with the air bag/cover subassembly to couple said inflator/reaction device subassembly with said air bag/cover subassembly;

said inflator housing having a substantially cylindrical configuration, and said reaction device comprising a pair of substantially coplanar plate sections extending away from diametrically opposed portions of said inflator housing;

at least one of said coplanar plate sections of said inflator housing being configured to form at least part of an aspiration passage which enables air to be aspirated into said air bag during operation of said air bag module.

26. An air bag module comprising an air bag/cover subassembly coupled to an inflator/reaction device subassembly, said air bag/cover subassembly consisting essentially of (i) a cover defining an air bag cavity and having an access opening communicating with said air bag cavity, (ii) a folded air bag disposed in said air bag cavity and a rim surrounding said access opening, said air bag having a portion defining a gas inlet opening, and (iii) means for connecting said portion of said folded air bag with said rim of said cover, said inflator/reaction device subassembly comprising an inflator housing having gas dispensing nozzles and a reaction device formed in one piece with said inflator housing, said inflator housing being disposed with said gas dispensing nozzles in fluid communication with said gas inlet opening of said air bag, and said reaction device being in direct contact with an outside portion of said air bag/cover subassembly and being fixedly connected thereto;

said rim having an inside surface presented to said air bag cavity and an outside surface forming part of the outside of the cover, said border portion of said air bag being disposed against the outside surface of said rim, and said reaction device being in direct contact with said border portion of said air bag so as to capture said mouth of said air bag between said reaction device and said outside surface of said rim, said means for connecting said border portion of said air bag with said cover comprising fasteners extending through aligned openings in said border portion of said air bag and said rim.

27. An air bag module as defined in claim 26 wherein said reaction device has a plurality of openings which are aligned with the aligned openings in the border portion of the air bag and the rim of the cover, said fasteners extending through said aligned openings in said cover, said border portion of said air bag and said reaction device, said fasteners being further adapted to connect said reaction device to a portion of a vehicle, whereby said fasteners fixedly connect to said inflator/reaction device subassembly with said air bag/cover subassembly to form said air bag module and said fasteners are adapted to fixedly connect said air bag module with a portion of a vehicle.

28. An air bag module for a vehicle comprising an air bag/cover subassembly coupled to an inflator/reaction device subassembly, said air bag/cover subassembly consisting essentially of (i) a cover defining an air bag cavity and having an access opening communicating with said air bag cavity, (ii) a folded air bag disposed in said air bag cavity and a rim surrounding said access opening, said air bag having a portion defining a gas inlet opening, and (iii) means for connecting said portion of said folded air bag with said rim of said cover, said inflator/reaction device subassembly comprising an inflator housing having gas dispensing nozzles and a reaction device formed in one piece with said inflator housing, said reaction device being adapted to transmit forces to such vehicle from the air bag module during deployment of the air bag, said inflator housing being disposed with said gas dispensing nozzles in fluid communication with said gas inlet opening of said air bag, said reaction device being in direct contact with an outside portion of said air bag/cover subassembly and being fixedly connected thereto, said rim having an inside surface presented to said air bag cavity and an outside surface forming part of the outside of the cover, said border portion of said air bag being disposed directly against the inside surface of said rim, and said means connecting said border portion of said air bag with said cover comprising (i) a retaining ring disposed on the inside of and against said border portion of said air bag so as to capture said border portion of said air bag between said retaining ring and said rim of said cover, and (ii) fasteners extending through aligned openings in said retaining ring, said border portion of said air bag, and said rim of said cover, said reaction device having a plurality of openings which are aligned with the aligned openings in the border portion of the air bag and the rim of the cover, said fasteners extending through said aligned openings in said cover, said border portion of said air bag and said reaction device, said fasteners being further adapted to connect said reaction device to a portion of a vehicle, whereby said fasteners fixedly connect said inflator/reaction device subassembly with said air bag/cover subassembly to form said air bag module and said fasteners are adapted to fixedly connect said air bag module with a portion of a vehicle.

29. A method of forming an air bag module for a vehicle comprising the steps of:
providing an air bag/cover subassembly consisting essentially of i) a cover defining an air bag cavity and having an access opening surrounded by a rim, said access opening communicating with said air bag cavity, ii) a folded air bag disposed in said air bag cavity, said air bag having a portion defining a gas inlet opening, and iii) fastening means connecting said portion of said air bag with said rim of said cover,
providing an inflator/reaction device subassembly comprising an inflator housing and a reaction device formed in one piece with the inflator housing, said reaction device being adapted to transmit forces to such vehicle from the air bag module during deployment of the air bag, said inflator housing having gas dispensing nozzles formed therein, and said inflator housing defining a cavity with a means for producing gas disposed therein,
disposing said reaction device directly against a portion of said air bag/cover subassembly with said inflator housing disposed with said gas generating nozzles in fluid communication with said gas inlet opening, and
coupling said inflator/reaction device subassembly with said portion of said air bag/cover subassembly.

30. A method of forming an air bag/cover subassembly consisting essentially of i) a cover having an air bag cavity and an access opening communicating with said air bag cavity, and ii) a folded air bag disposed in said air bag cavity, said air bag having a portion defining a gas inlet opening, said portion being connected with said cover,
said method comprising the steps of:
providing said cover,
prefolding said air bag outside of said air bag cavity in said cover,
inserting said prefolded air bag through said access opening and into said air bag cavity, and
fastening said portion of said air bag directly to said cover.

31. A one-piece structure for use as an inflator/reaction device subassembly, said structure comprising a substantially cylindrical housing with a cavity defined therein and a reaction device formed in one piece with said substantially cylindrical housing and extending away from said substantially cylindrical housing, said reaction device being adapted to transmit forces to a vehicle from an air bag module during deployment of an air bag.

32. A structure as defined in claim 31 wherein said substantially cylindrical housing and said reaction device are cold formed aluminum.

33. A structure as defined in claim 32 wherein said substantially cylindrical housing and said reaction device are impact extruded aluminum.

34. A structure as defined in any of claims 31–33 wherein said reaction device comprises a pair of substantially coplanar plate sections extending away from diametrically opposed portions of said substantially cylindrical housing.

35. A structure as defined in claim 34 wherein an aspiration portion is provided in one of said coplanar plate sections of said cylindrical housing.

36. Apparatus comprising an inflator/reaction device subassembly which is adapted to be coupled to an air bag/cover subassembly to form an air bag module;
said inflator/reaction device subassembly comprising an inflator housing having gas dispensing nozzles, means for producing gas disposed within said inflator housing, and a reaction device extending outwardly of said inflator housing;
said reaction device being adapted to be coupled with the air bag/cover subassembly to couple said inflator/reaction device subassembly with said air bag/cover subassembly;
said inflator housing having a substantially cylindrical configuration, and said reaction device comprising a pair of substantially coplanar plate sections extending away from diametrically opposed portions of said inflator housing; and
said plate sections being adapted to be directly coupled to said air bag/cover subassembly.

37. Apparatus as set forth in claim 36 wherein said pair of substantially coplanar plate sections includes two fingers extending away from diametrically opposed portions of said inflator housing, said fingers being adapted to be directly coupled to said air bag/cover subassembly.

38. An air bag module comprising an air bag/cover subassembly coupled to an inflator/reaction device subassembly,
said air bag/cover subassembly comprising a cover defining an air bag cavity and having an access opening communicating with said air bag cavity, a folded air bag disposed in said air bag cavity and an integral rim surrounding said access opening, said air bag having a portion defining a gas inlet opening, and means for connecting a portion of said folded air bag with said rim of said cover;
said inflator/reaction device subassembly comprising an inflator housing having gas dispensing nozzles, means for producing gas disposed within said inflator housing, and a reaction device extending outwardly of said inflator housing;
said reaction device being adapted to be coupled with the air bag/cover subassembly to couple said inflator/reaction device subassembly with said air bag/cover subassembly;
said inflator housing having a substantially cylindrical configuration, and said reaction device comprising a pair of substantially coplanar plate sections extending away from diametrically opposed portions of said inflator housing; and
said plate sections being adapted to be directly coupled to said air bag/cover subassembly.

39. An air bag module comprising an air bag/cover subassembly coupled to an inflator/reaction device subassembly,
said air bag/cover subassembly comprising a cover defining an air bag cavity and having an access opening communicating with said air bag cavity, a folded air bag disposed in said air bag cavity and an integral rim surrounding said access opening, said air bag having a portion defining a gas inlet opening, and means for connecting a portion of said folded air bag with said rim of said cover;
said inflator/reaction device subassembly comprising an inflator housing having gas dispensing nozzles, means for producing gas disposed within said inflator housing, and a reaction device extending outwardly of said inflator housing;

said reaction device being adapted to be coupled with the air bag/cover subassembly to couple said inflator/reaction device subassembly with said air bag/cover subassembly;

said inflator housing having a substantially cylindrical configuration, and said reaction device comprising two fingers extending away from diametrically opposed portions of said inflator housing, said fingers being adapted to be directly coupled to said air bag/cover subassembly.

40. An air bag module as set forth in claim 39 wherein said reaction device comprises four fingers, said four fingers including a first finger and a second finger seeparated by a gap and a third finger and a fourth finger separated by a gap, said first and third fingers extending away from diametrically opposed portions of said inflator housing, and said second and fourth fingers extending away from diametrically opposed portions of said inflator housing; and said four fingers being adapted to be directly coupled to said air bag/cover subassembly.

* * * * *

UNITED STATES PATENT AND TRADEMARK OFFICE
CERTIFICATE OF CORRECTION

PATENT NO. : 5,088,764

DATED : February 18, 1992

INVENTOR(S) : Augustitus et al.

It is certified that error appears in the above-identified patent and that said Letters Patent is hereby corrected as shown below:

Col. 14, line 66 delete "vaariable" and insert therefor --variable--

Col. 20, line 5 delete "seepa-" and insert therefor --sepa- --

Signed and Sealed this

Tenth Day of August, 1993

Attest:

MICHAEL K. KIRK

Attesting Officer

Acting Commissioner of Patents and Trademarks